United States Patent [19]
Krantz

[11] Patent Number: 5,802,851
[45] Date of Patent: Sep. 8, 1998

[54] MOTOR VEHICLE HYDROSTATIC TRANSMISSION SYSTEM

[75] Inventor: William Douglas Krantz, Fort Wayne, Ind.

[73] Assignee: Dana Corporation, Toledo, Ohio

[21] Appl. No.: 747,326

[22] Filed: Nov. 12, 1996

[51] Int. Cl.[6] .................................................. F16D 39/00
[52] U.S. Cl. .............................. 60/487; 418/30; 418/32
[58] Field of Search .............................. 60/487, 488, 489, 60/490; 92/12.1, 58, 72; 418/29, 30, 31, 32

[56] References Cited

U.S. PATENT DOCUMENTS

| | | |
|---|---|---|
| 3,301,366 | 1/1967 | Steinberg . |
| 3,921,774 | 11/1975 | Hagen . |
| 4,578,948 | 4/1986 | Hutson et al. ............................. 60/487 |
| 4,756,208 | 7/1988 | Hayashi et al. . |
| 4,899,541 | 2/1990 | Okada et al. ......................... 60/487 X |
| 4,903,545 | 2/1990 | Louis ..................................... 74/606 R |
| 4,922,787 | 5/1990 | Fujisaki et al. ...................... 60/487 X |
| 4,934,252 | 6/1990 | Giere . |
| 4,968,227 | 11/1990 | Szulczewski . |
| 4,982,566 | 1/1991 | von Kaler et al. ....................... 60/487 |
| 4,987,796 | 1/1991 | von Kaler et al. . |
| 5,234,321 | 8/1993 | Gafvert . |
| 5,259,194 | 11/1993 | Okada . |
| 5,261,801 | 11/1993 | Stone . |
| 5,279,206 | 1/1994 | Krantz et al. ....................... 92/12.1 X |
| 5,289,738 | 3/1994 | Szulczewski ......................... 60/487 X |
| 5,295,414 | 3/1994 | Nakamura et al. . |
| 5,394,699 | 3/1995 | Matsufuji . |
| 5,440,951 | 8/1995 | Okada et al. . |
| 5,505,279 | 4/1996 | Louis et al. .......................... 60/487 X |
| 5,593,000 | 1/1997 | Johnson ................................ 180/305 |
| 5,613,409 | 3/1997 | Hauser ................................. 60/487 X |
| 5,634,526 | 6/1997 | Johnson .............................. 60/487 X |

*Primary Examiner*—Hoang Nguyen
*Attorney, Agent, or Firm*—Oldham & Oldham Co., L.P.A.

[57] ABSTRACT

A hydrostatic transmission for a transaxle which contains two flanged mounting surfaces which are used to secure the transmission to the lower housing of the gear axle. A third point is used as a pilot diameter during assembly but is not required to secure the transmission to the gear axle. Such an arrangement provides a compact and efficient hydrostatic transmission for a transaxle which can be readily assembled and also provides extended service life for the internal components of the hydrostatic transmission.

10 Claims, 3 Drawing Sheets

MOTOR VEHICLE HYDROSTATIC TRANSMISSION SYSTEM

BACKGROUND AND SUMMARY OF THE INVENTION

The present invention relates generally to new and novel improvements in hydrostatic transmission systems for motor vehicles. More particularly, the present invention relates to hydrostatic transmission systems for motor vehicles particularly suitable for use in lawn tractors and other small motor vehicles.

Hydrostatic transmissions of the type to which the present invention relate have been commonly used commercially on relatively small lawn and garden tractors. One example of a vehicle which has used a prior art hydrostatic transmission is a mid-mount lawn tractor having an engine, front and rear wheels and a working implement or lawn mower mounted between the front and rear wheels. In this example, a transmission is disposed adjacent the rear wheels and includes an upwardly extending input section. The transmission is housed in a transmission case defining an opening at an upper portion thereof for exposing the input section. A hydraulic stepless change speed apparatus is located above the transmission and the change speed apparatus includes a downwardly extending input shaft for receiving power from the engine through an endless belt and a downwardly extending output shaft connected through the opening of the transmission case to the input section of the transmission. However, such prior art hydrostatic transmission arrangements for a transaxle have drawbacks which include being overly complex and bulky, difficult to assemble and subject to premature wear on the internal components of the hydrostatic transmission.

Accordingly, a preferred embodiment of the present invention is directed to a hydrostatic transmission for a transaxle which contains two flanged mounting surfaces which are used to secure the transmission to the lower housing of the gear axle. A third point is used as a pilot diameter during assembly but is not required to secure the transmission to the gear axle. Such an arrangement provides a compact and efficient hydrostatic transmission for a transaxle which can be readily assembled and also provides extended service life for the internal components of the hydrostatic transmission.

Other advantages and novel features of the present invention will become apparent in the following detailed description of the invention when considered in conjunction with the accompanying drawings.

DETAILED DESCRIPTION OF THE DRAWINGS

Figure 1:
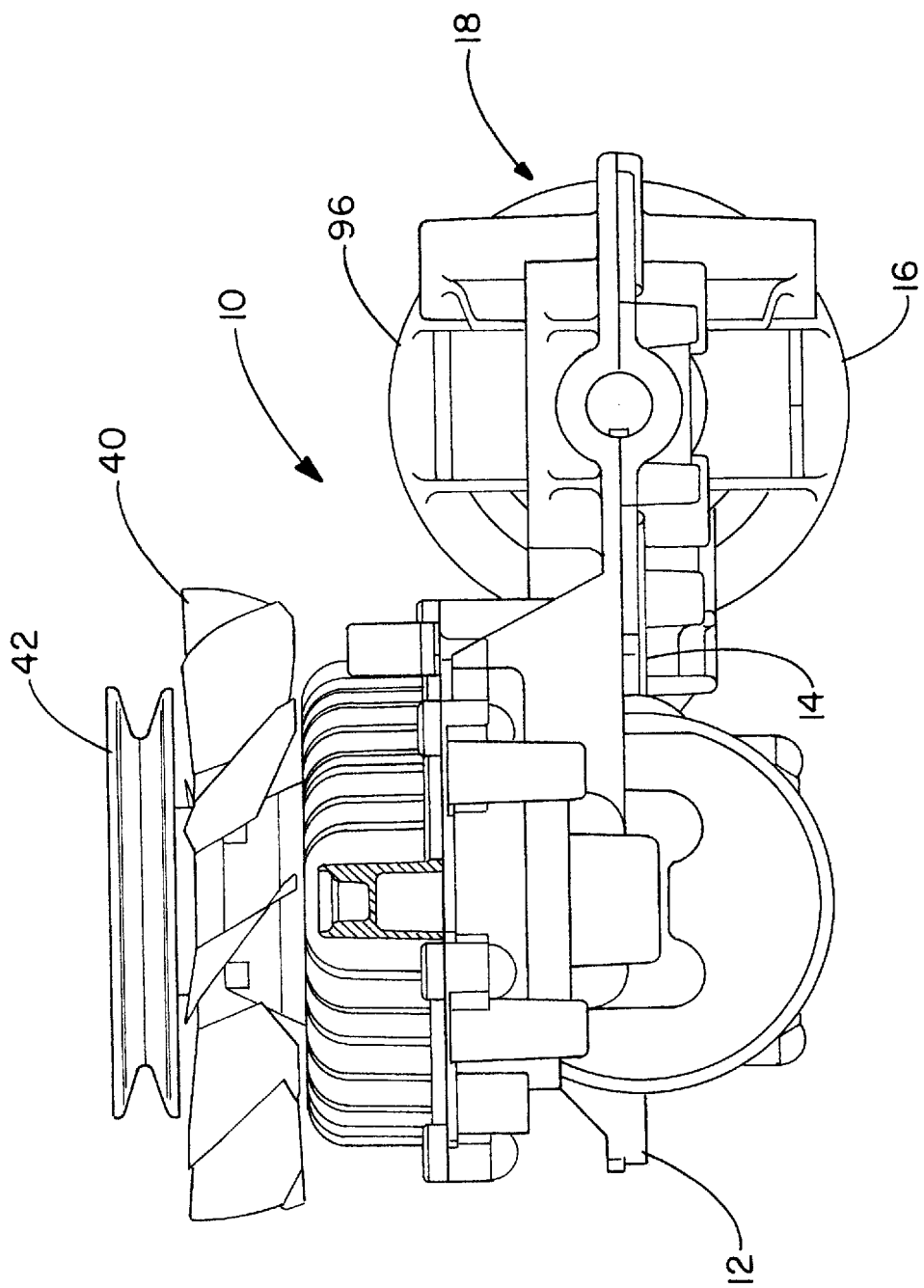
FIG. 1 illustrates a plan side view of a motor vehicle hydrostatic transmission for a transaxle in accordance with a preferred embodiment of the present invention.
Figure 2:
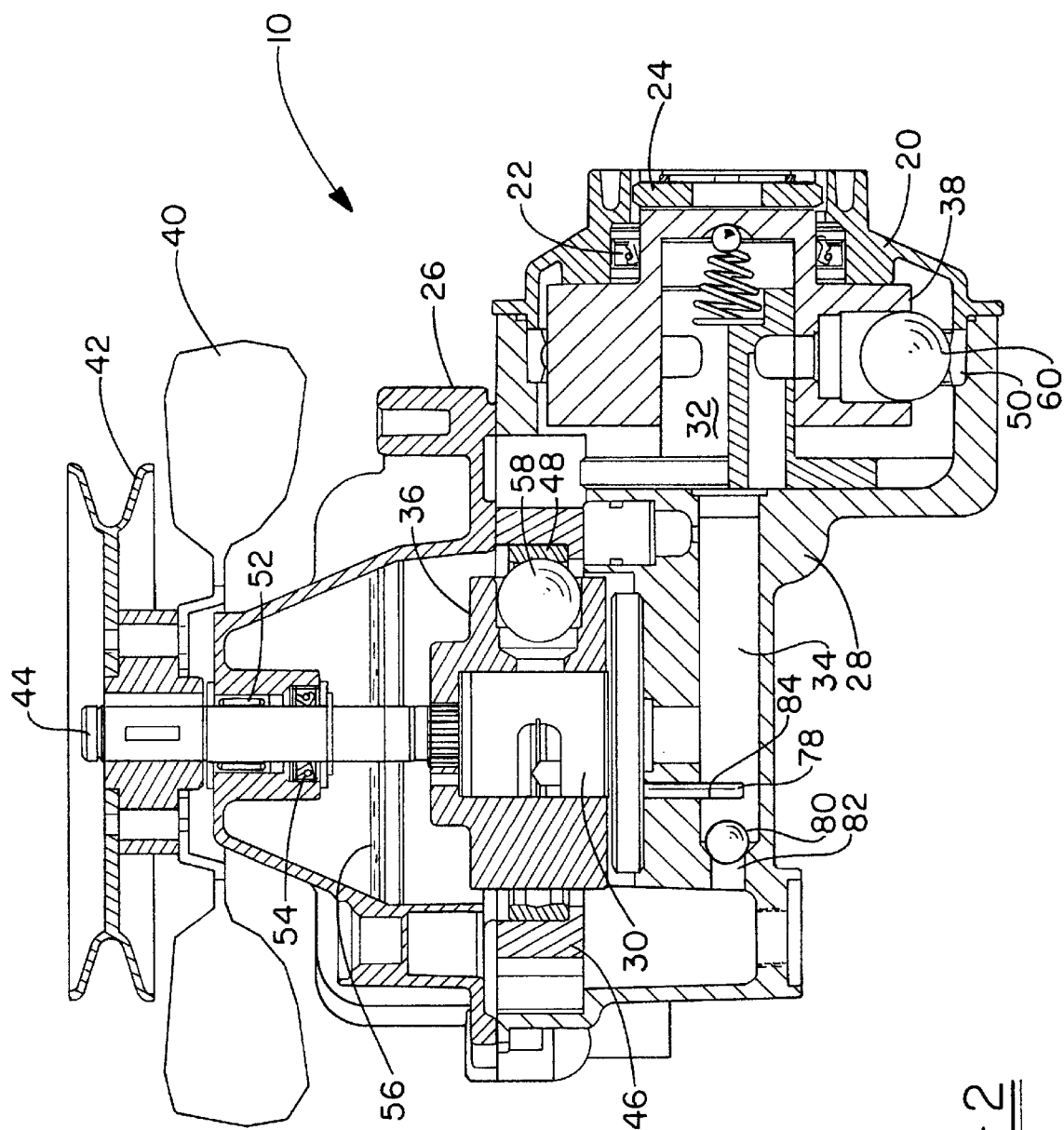
FIG. 2 illustrates a side view, partly in cross-section and partly in plan view, of the preferred embodiment of a motor vehicle hydrostatic transmission for a transaxle as shown in FIG. 1.
Figure 3:
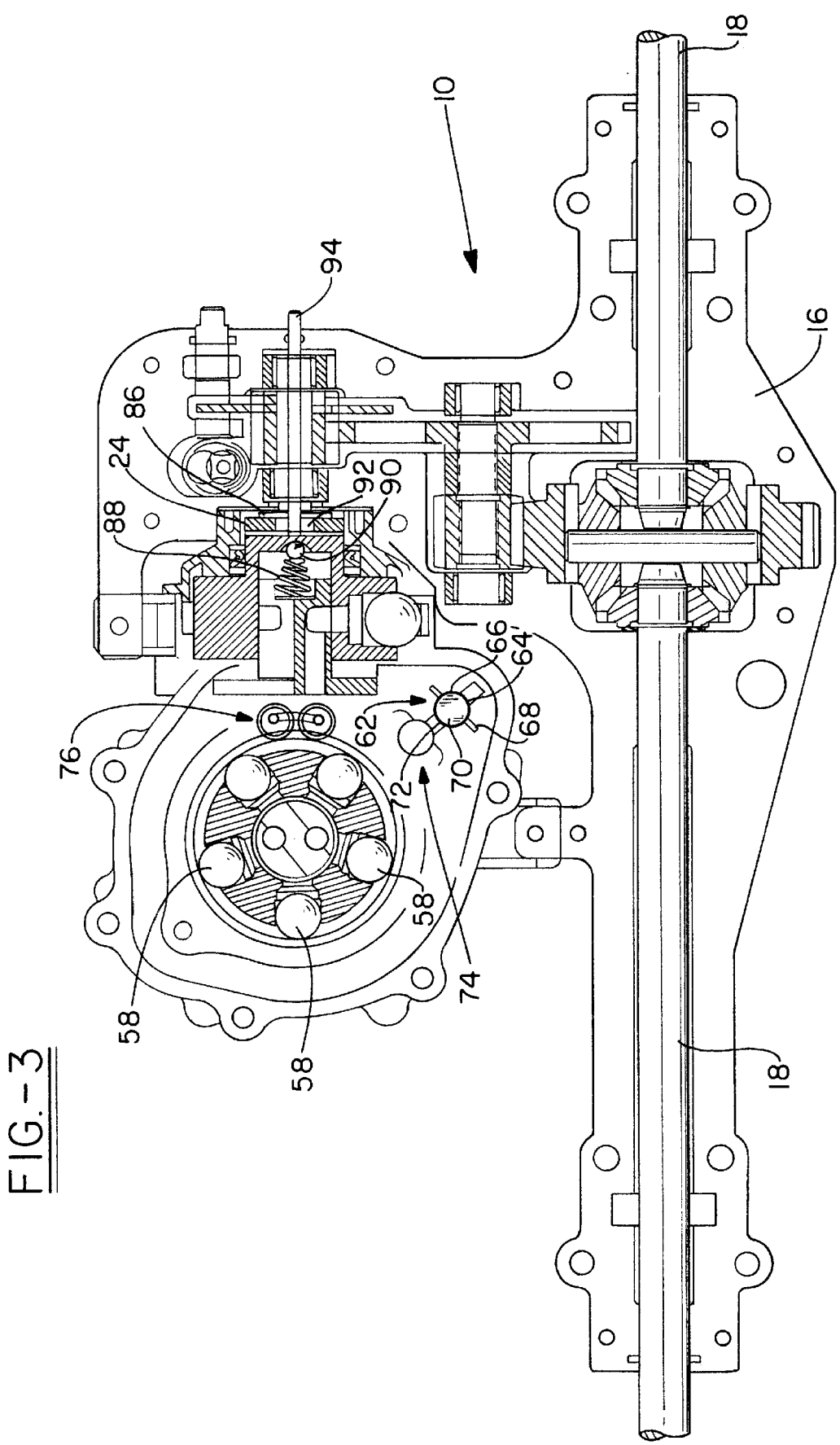
FIG. 3 illustrates a top view, partly in cross-section and partly in plan view, of the preferred embodiment of a motor vehicle hydrostatic transmission for a transaxle as shown in FIG. 1.

In the following detailed description of preferred embodiments of the present invention, reference is made to the accompanying drawings which, in conjunction with this detailed description, illustrate and describe a preferred embodiment of a motor vehicle hydrostatic transmission for a transaxle in accordance with the present invention. Referring now to FIGS. 1 through 3, illustrating a side view, a side view, partly in cross-section and partly in plan view, and a top view, partly in cross-section and partly in plan view, respectively, of a motor vehicle hydrostatic transmission, generally identified by reference numeral 10, for a transaxle in accordance with a preferred embodiment of the present invention, motor vehicle hydrostatic transmission 10 includes first flanged mounting surface 12 and second flanged mounting surface 14 which are used to secure motor vehicle hydrostatic transmission 10 to lower housing 16 of gear axle 18. A third point, output cover 20, is used as a pilot diameter during assembly, but is not required to secure motor vehicle hydrostatic transmission 10 to gear axle 18. Output cover 20 and output shaft seal 22, which is preferably a radial lip seal, are is used to seal in lubricating grease for splined drive key 24 of motor vehicle hydrostatic transmission 10 on one side and to seal in hydraulic oil on the opposite side. Output cover 20 is preferably not rigidly fixed to gear axle 18 due to potential problems caused by clamping output cover 20 and sensitivity to its sealing operation.

Motor vehicle hydrostatic transmission 10 generally includes three housings, output cover 20, input cover 26 and main housing 28, each of which are preferably separate die cast parts. Main housing 28 contains pump pintle 30 and motor pintle 32 which are secured to main housing 28 by a series of bolts (not shown). Pump pintle 30 and motor pintle 32 communicate hydraulically through cast and machined passages 34 integral to main housing 28. Hydraulic flow is achieved through pump rotor 36 which rotates about pump pintle 30. Input power is thus transferred from fan 40 and pulley 42 assembly coupled about splined input shaft 44 which is mechanically connected to pump rotor 36. Pump rotor 36, cam ring 46 and pump race 48 determine the direction of hydraulic flow and hence the output direction being forward or reverse. Motor race 50 connects with main housing 28.

In the preferred embodiment of motor vehicle hydrostatic transmission 10 shown, needle bearing 52 is used, rather than ball bearings, to support and align splined input shaft 44. Input shaft seal 54, preferably a radial lip seal, is located just below needle bearing 52. Similarly, output shaft seal 22, also preferably a radial lip seal, is positioned between output cover 20 and motor rotor 38. Input shaft seal 54 provides a seal which retains hydraulic fluid 56.

Splined input shaft 44 transfers mechanical energy to pump rotor 36 and pump rotor 36 converts this mechanical energy into hydraulic energy and transfers this hydraulic energy to motor rotor 38. Pump rotor 36 preferably contains five ball bearings 58 which are nested radially about pump rotor 36. Similarly, motor rotor 38 preferably contains five ball bearings 60 which are nested radially about motor rotor 38. Linear movement of ball bearings 58 is controlled through cam ring 46 and pump race 48 pivoting about a single point to provide eccentricity about pump pintle 30 and pump rotor 36, and motor race 50 installed in main housing 28 to provide a fixed eccentricity about motor pintle 32 and motor rotor 38, which in turn, provides for the output speed of motor vehicle hydrostatic transmission 10. Cam ring 46 is pivoted about control device 62 which is coupled to speed selection linkage 64. Control device 62 is biased upward by compression spring 66 and is trapped by dowel 68 pressed through control shaft 70 and captured about groove 72, which acts as neutral centering device 74. Groove 72 is preferably machined into input cover 26 to align control shaft 70 about a neutral axis from which cam ring 46 is pivoted. When cam ring 46 is aligned about this neutral axis, motor vehicle hydrostatic transmission 10 is said to be centered or in neutral. However, due to manufacturing tolerances typically inherent in the combined neutral position components, an exact and true neutral is rarely achieved in commercially produced motor vehicle hydrostatic transmissions. To ensure that cam ring 46 will be aligned within a neutral range, neutral centering device 74 is used in conjunction with wide band neutral 76.

Wide band neutral 76 ensures that when cam ring 46 pivots about the neutral axis or within a specified range of cam ring 46 eccentricity, a neutral condition is achieved. Although ball bearings 58 and 60 operating within pump rotor 36 and motor rotor 38, respectively, will provide hydraulic flow in and around neutral, this hydraulic flow is diverted or bled off main hydraulic pressure line (not shown) feeding motor rotor 38, thus eliminating output rotation to the transaxle, commonly referred to as "vehicle creep" in the lawn and garden industry. Dowel 78 is housed and located in main housing 28 and traps check valve ball 80 within check valve cavity 82. Check valve ball 80 is positioned downstream from dowel 78 to provide a sealing surface against bore 84 which is sized for dowel 78.

When hydraulic flow is transferred to motor rotor 38, ball bearings 60, which are nested radially about motor rotor 38, are forced outwardly when located on the pressure side of the hydraulic loop. This outward thrust of ball bearings 60 is transferred by motor race 50 pressed into main housing 28 which provides a cam angle which translates the linear movement of ball bearings 60 into radial movement of motor rotor 38.

Transmittal of output hydraulic power to the input of gear axle 18 is achieved in a coupling arrangement referred to as a "mechanical tow release mechanism." Splined drive key 24 captured by retaining lock ring 86 is located within motor rotor 38. Located on the opposite side of splined drive key 24 and captured between motor rotor 38 and motor pintle 32 is spring 88, preferably conical in configuration, which pivots about ball bearing 90. Spring 88 allows linear movement of motor rotor 38 toward splined input shaft 44 of gear axle 18. Splined drive key 24 located within motor rotor 38 mechanically connects splined input shaft 92 in gear axle 18. The force of spring 88 moves motor rotor 38 axially to provide a continuously coupled splined drive to transmit rotational energy.

When motor vehicle hydrostatic transmission 10 is shut down, a hydraulic lock is created within the operating components which prevents readily pushing a tractor by human power. In order to overcome this hydraulic lock and thus enable human power to propel the tractor, tow pin 94 is located external to gear axle 18 and about the centerline to motor rotor 38 and allows motor rotor 38 to be biased away from splined input shaft 92, thus disconnecting the coupled spline drive between motor rotor 38 and splined input shaft 92 to gear axle 18. The gears within the axle may then rotate without the resistance to rotation once inhibited by motor rotor 38. Upon release of the tow pin actuation force, spring 88 located opposite tow pin 94 will bias motor rotor 38 toward splined input shaft 92 and re-engage the coupled spline drive for further vehicle operation.

Motor rotor 38 and accompanying components are contained within main housing 28 and are protected by output cover 20. Output cover 20 contains output shaft seal 22 which seals hydraulic fluid 56 within output cover 20 and main housing 28. The remaining section of output cover 20 is contained within lower housing 16 and upper housing 96 of gear axle 18 and holds lubricating grease for the coupled drive between motor vehicle hydrostatic transmission 10 and gear axle 18.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A coupling assembly between a motor vehicle hydrostatic transmission and a gear axle having an input shaft, said coupling assembly comprising:

a tow pin positioned external of the gear axle and about the centerline of a motor rotor which allows said motor rotor to be biased away from the gear axle, thus disconnecting a spline drive coupling between said motor rotor and the input shaft to the gear axle to overcome hydraulic lock when the motor vehicle hydrostatic transmission is shut down and to permit human power to propel the motor vehicle.

2. The coupling assembly between a motor vehicle hydrostatic transmission end a gear axle having an input shaft in accordance with claim 1, wherein a needle bearing provides support and alignment for said input shaft.

3. The coupling assembly between a motor vehicle hydrostatic transmission and a gear axle having an input shaft in accordance with claim 2, wherein a radial lip seal retains hydraulic fluid in the motor vehicle hydrostatic transmission.

4. The coupling assembly between a motor vehicle hydrostatic transmission and a gear axle having an input shaft in accordance with claim 3, wherein said input shaft transfers mechanical energy to a pump rotor and said pump rotor converts the mechanical energy into hydraulic energy and transfers the hydraulic energy to a motor rotor.

5. The coupling assembly between a motor vehicle hydrostatic transmission and a gear axle having an input shaft in accordance with claim 4, wherein said pump rotor includes a plurality of ball bearings nested radially around said pump rotor and linear movement of said plurality of ball bearings is controlled through a cam ring and pump race pivoting about a single point to provide eccentricity about a pump pintle and said pump rotor and a motor race installed in a main housing to provide a fixed eccentricity about a motor pintle and said motor rotor to provide for the output speed of said motor vehicle hydrostatic transmission.

6. The coupling assembly between a motor vehicle hydrostatic transmission and a gear axle having an input shaft in accordance with claim 1, wherein a radial lip seal retains hydraulic fluid in the motor vehicle hydrostatic transmission.

7. The coupling assembly between a motor vehicle hydrostatic transmission and a gear axle having an input shaft in accordance with claim 1, wherein said input shaft transfers mechanical energy to a pump rotor and said pump rotor converts the mechanical energy into hydraulic energy and transfers the hydraulic energy to a motor rotor.

8. The coupling assembly between a motor vehicle hydrostatic transmission and a gear axle having an input shaft in accordance with claim 5, wherein said plurality of ball bearings nested radially about said pump rotor consists of five ball bearings nested radially about said pump rotor.

9. The coupling assembly between a motor vehicle hydrostatic transmission and a gear axle having an input shaft in accordance with claim 1, wherein said pump rotor includes a plurality of ball bearings nested radially around said pump rotor and linear movement of said plurality of ball bearings is controlled through a cam ring and pump race pivoting about a single point to provide eccentricity about a pump pintle and said pump rotor and a motor race installed in a main housing to provide a fixed eccentricity about a motor pintle and said motor rotor to provide for the output speed of said motor vehicle hydrostatic transmission.

10. The coupling assembly between a motor vehicle hydrostatic transmission and a gear axle having an input shaft in accordance with claim 9, wherein said plurality of ball bearings nested radially about said pump rotor consists of five ball bearings nested radially about said pump rotor.

* * * * *